United States Patent
Channell (10) Patent No.: US 9,817,896 B2
(45) Date of Patent: Nov. 14, 2017

(54) SEARCH QUERY SCORING AND POPULARITY MONITORING AND SYSTEMS AND METHODS THEREFOR

(75) Inventor: Brian Paul Channell, Redondo Beach, CA (US)

(73) Assignee: EXCALIBUR IP, LLC, New York, NY (US)

( * ) Notice: Subject to any disclaimer, the term of this patent is extended or adjusted under 35 U.S.C. 154(b) by 728 days.

(21) Appl. No.: 12/110,533

(22) Filed: Apr. 28, 2008

(65) Prior Publication Data
US 2009/0271368 A1 Oct. 29, 2009

(51) Int. Cl.
*G06F 17/30* (2006.01)

(52) U.S. Cl.
CPC ............... *G06F 17/30864* (2013.01)

(58) Field of Classification Search
CPC ................................................. G06F 17/30864
USPC ........................................................ 707/741
See application file for complete search history.

(56) References Cited

U.S. PATENT DOCUMENTS

| | | | |
|---|---|---|---|
| 6,338,058 B1 * | 1/2002 | Jacobson et al. | |
| 7,672,937 B2 * | 3/2010 | Madhavan et al. | ........... 707/752 |
| 8,364,669 B1 * | 1/2013 | Chowdhury | ...... G06F 17/30038 707/726 |
| 9,317,559 B1 * | 4/2016 | Blair-Goldensohn | G06F 17/3053 |
| 2004/0186783 A1 * | 9/2004 | Knight et al. | .................. 705/16 |
| 2007/0136753 A1 * | 6/2007 | Bovenschulte | ........ H04H 60/31 725/46 |
| 2008/0109401 A1 * | 5/2008 | Sareen et al. | ...................... 707/3 |
| 2008/0306937 A1 * | 12/2008 | Whilte et al. | ...................... 707/5 |
| 2009/0327286 A1 * | 12/2009 | Ge et al. | ........................... 707/5 |
| 2010/0223129 A1 * | 9/2010 | Harmon | ..................... 705/14.52 |
| 2012/0011116 A1 * | 1/2012 | McKeeth | ...................... 707/723 |
| 2013/0185289 A1 * | 7/2013 | Chowdhurty | ......... F16N 31/004 707/722 |
| 2013/0283306 A1 * | 10/2013 | Rao et al. | ....................... 725/14 |

OTHER PUBLICATIONS

Leonard Maltin, "Movie and Video Guide for Palm Powered Handhelds", Nov. 2003, Landware, Inc., pp. 5-14.*
Xuehua Shen et al., "Implicit User Modeling for Personalized Search", Oct. 31, 2005, ACM, pp. 824-831.*
Eugene Agichtein et al, "Improving Web Search Ranking by Incorporating User Behavior Information", 2006, ACM, pp. 1-8.*

\* cited by examiner

*Primary Examiner* — Etienne Leroux
*Assistant Examiner* — Jared Bibbee
(74) *Attorney, Agent, or Firm* — James J. DeCarlo; Greenberg Traurig, LLP (57) ABSTRACT

A method of indicating the popularity of the subject of a search query comprising receiving a search query from a user, the search query being received by a search server; determining whether the search query is likely to be related to a particular thing; obtaining popularity information for the particular thing; and, transmitting an indicator of the popularity information to a user computer for display. Some embodiments may also include targeted information about the search query subject, including a map showing the search query subject's location, the location of similar things in the same region as the search query subject, one or more advertisements, and the like. The targeted information and/or the popularity information indicator may be displayed with, or separate from search results associated with the search query.

57 Claims, 8 Drawing Sheets

SEARCH QUERY SCORING AND POPULARITY MONITORING AND SYSTEMS AND METHODS THEREFOR

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of information technology, and more specifically provides a system and methods through which search queries can be assigned a score based on a variety of factors, including, without limitation, the requestor's location, the frequency with which others are entering similar queries, and the like.

SUMMARY

In some instances, it can be advantageous for a user to see how many other users are searching for or viewing the same information, and how that behavior changes over time. By way of example, without limitation, a restaurant may be recommended to a visitor to a city. Although many reviews of the restaurant may be available, the reviews may not have been written recently. However, if the user can gain access to behavior trends, such as the number of times for which the restaurant has been searched recently compared to some historical information, that may allow the user to better gauge the validity or relevance of the review/recommendation and the popularity of the restaurant. Similarly, a user wishing to attend a movie can use the instant system and method to see how popular a particular movie is at a given theater, and thereby discern the likelihood of obtaining tickets to that movie. Still further, the instant system and method can be used by a user to determine the popularity of a particular automobile make and model, thereby giving the user more information when negotiating the price of the vehicle.

In a similar context, a service provider, such as, without limitation, an advertising service provider, can utilize the instant system and method to derive rates for displaying an advertisement as part of or in association with a particular search query.

Some embodiments comprise computer program process code, tangibly stored on a computer readable medium, the computer program process code comprising instructions interpretable by a processor, the instructions comprising receiving a search query from a user; determining whether the search query is likely to be targeted at a particular thing; obtaining popularity information for the particular thing; and causing an indicator of the popularity information to be displayed along with results of the search query. In some embodiments, the thing may comprise one of a restaurant, a make of automobile, a motion picture, a motion picture theater, a retail store, and a hotel. In some embodiments, the popularity information comprises a relative popularity score, and may also include a graphic reflective of the relative popularity score. By way of example, without limitation, the relative popularity score may reflect a difference in the number of search queries targeted at the particular thing received over a first period of time compared to a second period of time, a difference in the sales of the particular thing over a first period of time compared to a second period of time, a difference in the revenues of the particular thing over a first period of time compared to a second period of time, a difference in the popularity of the particular thing compared to the popularity of similar things, or the like.

In some embodiments, targeted information about the thing may be obtained, the targeted information may be caused to be displayed for the user. In such embodiments, the targeted information may be displayed along with the search results, and/or may be displayed only when the relative popularity score exceeds a given threshold. In some embodiments, the popularity information indicator may be displayed as part of the targeted information. The targeted information may further comprise at least one advertisement, a map on which the location of the thing is displayed, and other such information. In embodiments incorporating a map, the map may comprise indicators of similar things that are geographically proximate to the thing (i.e., the subject of the search query), representations of relative popularity scores for each of the similar things displayed on the map, and the like. In some embodiments, each indicator may comprise a link to information about the respective similar thing.

In some embodiments, the user enters the search query via a browser running on a user computer, and the popularity information and/or targeted information can be displayed in the browser.

Some embodiments include a method comprising receiving a search query from a user, the search query being received by a search server; determining whether the search query is likely to be targeted at a particular thing; obtaining popularity information for the particular thing; and, transmitting an indicator of the popularity information to a user computer for display. In some embodiments, the thing may comprise one of a restaurant, a make of automobile, a motion picture, a motion picture theater, a retail store, and a hotel. The popularity information may comprise a relative popularity score, the relative popularity score reflecting a difference in the number of search queries targeted at the particular thing received over a first period of time compared to a second period of time, a difference in the sales of the particular thing over a first period of time compared to a second period of time, a difference in the revenues of the particular thing over a first period of time compared to a second period of time, a difference in the popularity of the particular thing compared to the popularity of similar things, or the like. The popularity information indicator may comprise a graphic, the graphic indicative of the relative popularity score.

In some embodiments the method further comprises obtaining targeted information about the thing and transmitting the targeted information to the user computer for display to the user. In some embodiments, the targeted information is displayed only when the relative popularity score exceeds a given threshold. The targeted information may comprise at least one advertisement and/or a map on which the location of the thing is displayed. In embodiments employing a map, the map may further comprise indicators of similar things that are geographically proximate to the thing, including representations of relative popularity scores for each of the similar things displayed on the map. Each indicator may also comprise a link to information about the respective similar thing.

Additional features and advantages will be set forth in the description which follows, and in part will be apparent from this disclosure, or may be learned by practice of the disclosed search query scoring and popularity monitoring and method. The objectives and other advantages will be realized and attained by the structure particularly pointed out in this written description, including any claims contained herein and the appended drawings.

It is to be understood that both the foregoing general description and the following detailed description are exemplary and explanatory and are intended to provide further explanation of the disclosed search query scoring and popularity monitoring system and method.

BRIEF DESCRIPTION OF THE DRAWINGS

The accompanying drawings, which are included to provide a further understanding of the disclosed search query scoring and popularity monitoring system and method and are incorporated in and constitute a part of this specification, illustrate various embodiments and, together with the description, serve to explain the principles of at least one embodiment of the disclosed search query scoring and popularity monitoring system and method.

In the drawings.

DETAILED DESCRIPTION

Reference will now be made in detail to embodiments of the disclosed search query scoring and popularity monitoring system and methods, examples of which are illustrated in the accompanying drawings.

For the purposes of this disclosure, a computing device (also referred to herein as a "computer") includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

For the purposes of this disclosure, a server comprises software and/or hardware running on one or more computing devices which receives information requests from other servers, user computers, or other computing devices, and responds to such requests. A number of program modules and data files may be stored on a computer readable medium of the server. They may include an operating system suitable for controlling the operation of a networked server computer, such as the WINDOWS VISTA, WINDOWS XP, or WINDOWS 2003 operating systems published by Microsoft Corporation of Redmond, Wash., the Ubuntu operating system distributed by Canonical Ldt. of Douglas, Isle of Mann.

For the purposes of this disclosure a search server is software, hardware, or firmware (or combinations thereof) capable of storing data in a database and searching the database or other repository to find relevant content to be served to users. A search server may be a single server or a group of servers acting together. A search server selects content to serve based on algorithms meant to direct to the user that content which is most relevant to the user's search terms or likely to be of interest to the user given the search terms. Such search servers may be implemented by a search engine provider (e.g. YAHOO! Inc., Google Inc., and the like), or other service provider. In some embodiments, the search results are served in the form of, or in a form that can be easily incorporated into, a Hypertext Markup Language ("HTML") document using the Hypertext Transfer Protocol ("HTTP").

For the purposes of this disclosure an advertising server is software, hardware, or firmware (or combinations thereof) capable of storing data in a database and searching the database or other repository to find relevant advertisements to be served to users. An advertising server may be a single server or a group of servers acting together. An advertising server selects advertisements to serve based on algorithms meant to direct to the user those advertisements which are most relevant to the user or likely to be of interest to the user. Such advertising servers may be implemented by an advertising service provider (e.g. YAHOO! Inc., Google Inc., and the like), or other service provider. In some embodiments, the advertisements are served in the form of, or in a form that can be easily incorporated into, a Hypertext Markup Language ("HTML") document using the Hypertext Transfer Protocol ("HTTP").

For the purposes of this disclosure the terms "network browsing application" and "browser" are intended to be synonymous and are intended to encompass application software, running on a computing device, which is at least capable of interpreting information stored using Hypertext Markup Language ("HTML"), Extensible Markup Language ("XML"), or other language derived from the Standardized Generalized Markup Language. Examples of such browsers include, but are not limited to, Internet Explorer distributed by Microsoft Corporation; Firefox distributed by the Mozilla Foundation of Mountain View, Calif.; Camino distributed by the Camino Project; and Opera distributed by Apple Computer, Inc. of Cupertino, Calif.

For the purposes of this disclosure a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to store the desired information and which can be accessed by the computer.

For the purposes of this disclosure, the term item comprises a plurality of things about which a user might search. By way of non-limiting example, items may include restaurants, sports complexes, motion pictures, television shows, actors, musical artists, sculptures, movie theaters, fashion designers, automobiles, retailers, companies, cities, states, countries, other geographic regions, and the like.

Figure 1:
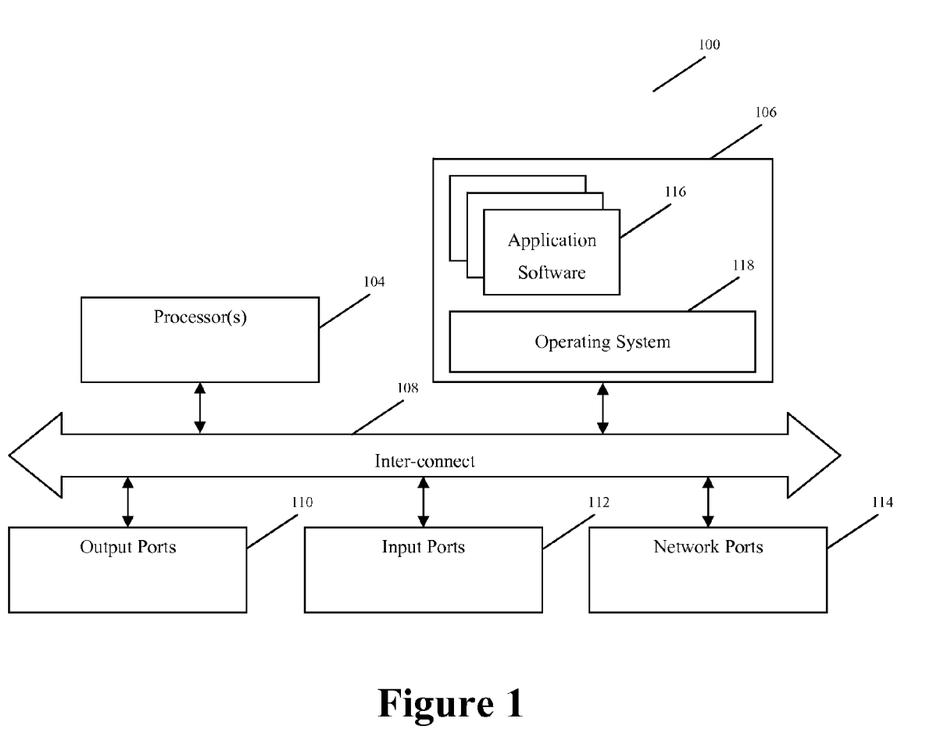
FIG. 1 is a block diagram of a user computing device.

FIG. 1 is a block diagram illustrating components of an exemplary user computing device 100. In some embodiments, user computing device 100 comprises an interconnect 108 (e.g., bus, system core logic, or the like), which facilitates communication between the various components of user computing device 100 such as, without limitation, processor(s) 104 and memory 106. Furthermore, interconnect 108 can allow processor 104 and/or memory 106 to communicate with peripheral devices, including those connected via input ports 112 and output ports 110. Input ports 112 and output ports 110 can communicate with I/O devices such as mice, keyboards, modems, network interfaces, printers, scanners, video cameras and other devices. In addition, output port 110 can further communicate with a display.

Interconnect 108 may also comprise one or more buses connected to one another through various bridges, controllers and/or adapters. In some embodiments, input ports 112 and output ports 110 can include a USB (Universal Serial Bus) adapter for controlling USB peripherals, and/or an IEEE-1394 bus adapter for controlling IEEE-1394 peripherals. Inter-connect 108 can also include one or more network ports 114, through which the user computing device can be communicatively coupled with a communication network.

In some embodiments, memory 106 may include ROM (Read Only Memory), and volatile RAM (Random Access Memory) and non-volatile memory, such as hard drive, flash memory, computer-readable media, or the like. Volatile RAM is typically implemented as dynamic RAM (DRAM), which requires continuous power to refresh or maintain the data in the memory. Non-volatile memory is typically a magnetic hard drive, flash memory, a magneto-optical drive, or an optical drive (e.g., a DVD RAM), or other type of memory system which maintains data even after power is removed from the system. Computer-readable media can include, without limitation, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), or the like.

In some embodiments, memory 106 can be a local device coupled directly to the other components or modules in the data processing system. A non-volatile memory that is remote from the system, such as a network storage device coupled to the data processing system through a network interface such as a modem or Ethernet interface, can also be used.

In some embodiments, routines executed to implement one or more embodiments may be implemented as part of an operating system 118 or a specific application, component, program, object, module or sequence of instructions, collectively referred to herein as application software 116. Application software 116 typically comprises one or more instruction sets that can be executed by microprocessor 104 to perform operations necessary to execute elements involving the various aspects of the methods and systems described herein.

Figure 2:
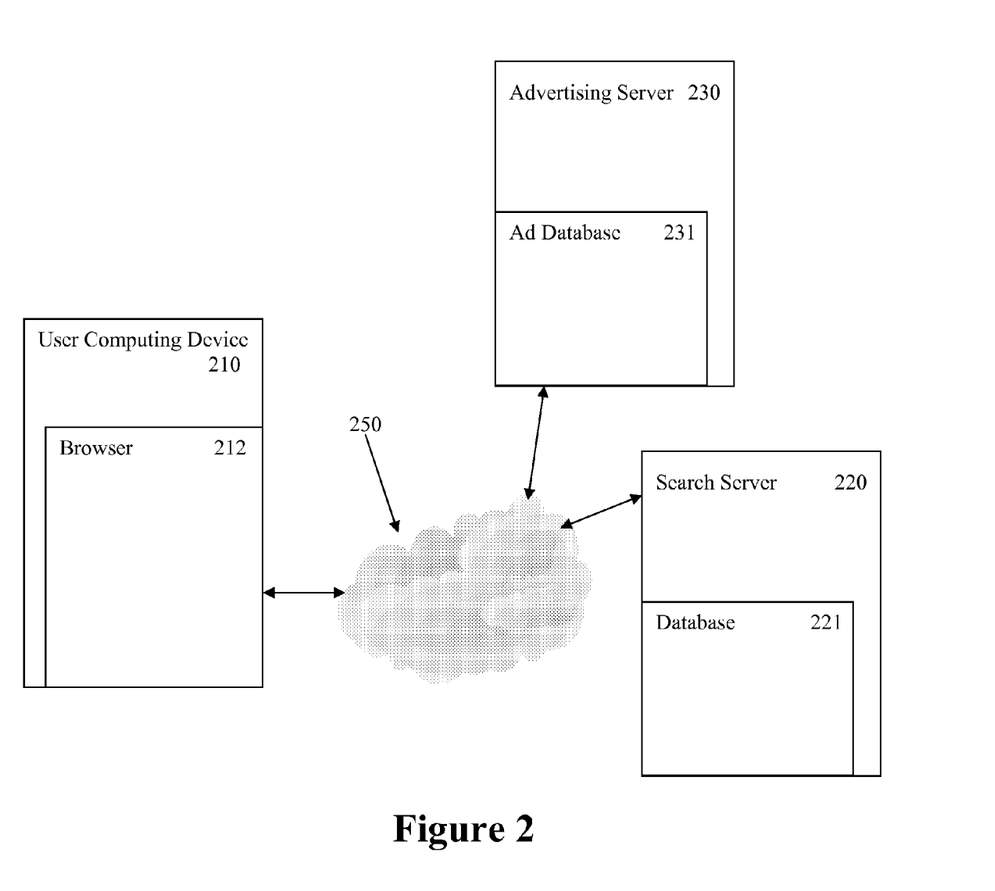
FIG. 2 is a block diagram of a network architecture facilitating the disclosed search query scoring and popularity monitoring system.

FIG. 2 illustrates a network architecture supporting the disclosed search query scoring system. In FIG. 2, user computing device 210 comprises one or more computer readable media, on which browser 212 is stored. A user causes user computing device 210 to load browser 212, thereby allowing the user to access search services provided by search server 220. In some embodiments, search server 220 provides a browser interpretable document, such as, without limitation, a document comprising HTML code, to browser 212 via network 250 when browser 212 initiates communications with server 220. The browser interpretable document can allow browser 212 to generate a user interface through which the user can enter one or more search queries.

Figure 4:
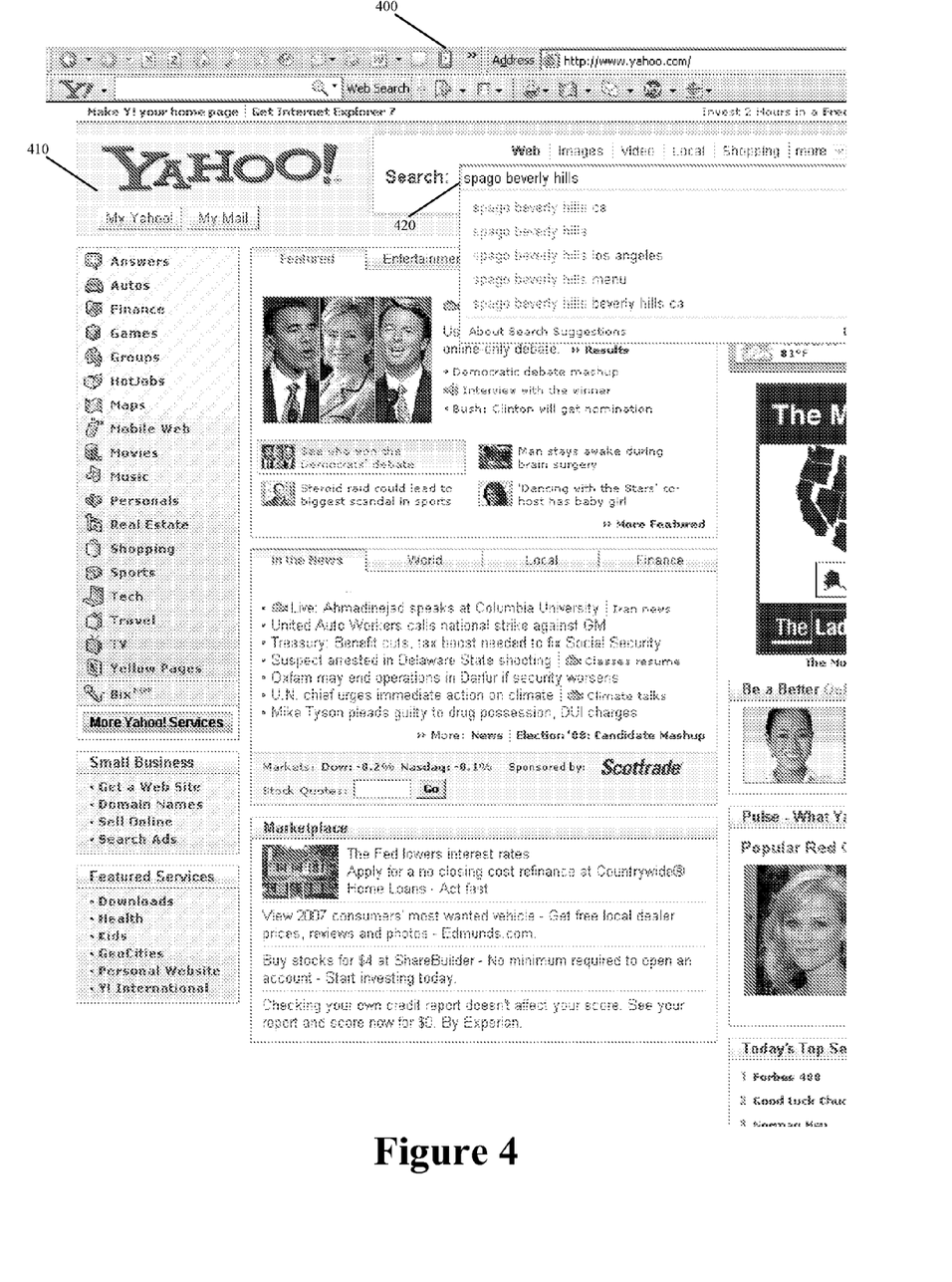
FIG. 4 is a screen capture illustrating an exemplary search entry page displayed in a network browsing application.

FIG. 4 illustrates a browser 400 interpreting an exemplary browser interpretable document to provide such a user interface 410. Search queries entered through user interface 410 may be simple keyword type queries, natural language queries, Boolean queries, or the like. In the embodiment illustrated in FIG. 4, the user is entering a search for a restaurant ("Spago") in a particular city ("Beverly Hills") in search query entry field 420.

Referring again to FIG. 2, when the user submits the search query, search server 220 receives the query and searches database 221 or other such repository for information relevant to the search query. The relevant information may be determined using any conventional search engine search technique or combinations thereof. The search results may include, but are not limited to, links, Uniform Resource Locators ("URL's"), or other pointers to relevant information accessible via network 250 or other communications means and summaries of the content available therefrom. In some embodiments, the search results may also comprise content related to the search query, such as, without limitation photographs, drawings, maps, videos, or other media representative of one or more search results, or the like. In some embodiments, the search results may be formatted as one or more HTML documents and transmitted to browser 212 for display to the user.

In addition to providing traditional search results, search server 220 can also return information indicative of the popularity of one or more search results. By way of example, without limitation, the search results returned by search server 220 may include indirect links, or URL's which refer back to search server 220 to access the corresponding content, thereby allowing server 220 to monitor the search results viewed by the user. In some embodiments, the search results page may include browser interpretable instructions, such as, without limitation, those written in JavaScript, VisualBasic Script, JAVA, or the like, which allow the browser interpretable document to monitor the user's interactions with the search results without necessitating the use of indirect links. In some embodiments, browser 212 may comprise one or more browser helper applications that facilitate the monitoring of user interactions with the search results without necessitating the use of indirect links.

In some embodiments, in addition to retrieving search results, search server 220 can also allow one or more advertisements to be incorporated into or otherwise associated with the search results. Search server 220 can obtain the relevant advertisement from advertisement server 230, which can select the appropriate advertisement from an advertisement database. The advertisement may be selected based on a number of criteria, including relevancy to the user's search query, relevancy to one or more search results, information derived from the user's social networking information, or the like. In some embodiments, advertisement server 230 may select an advertisement based solely on the popularity of the advertisement, with little or no regard to the actual relevance of the advertisement to the subject matter searched or to the search results. This can allow advertisers to promote trendy products or services to potential consumers (e.g., users) based on the fact that the consumer is looking for other, similarly trendy information. By contrast, in some embodiments, server 230 may select the advertisement based on demographic and/or behavioral information associated with the user's friends. Such friends may be determined through a variety of means, including, without limitation, by analyzing the persons appearing on the user's instant messenger "buddy" list, the user's inbox, or by associations between the user and the person(s) in one or more social networking services, such as, without limitation, the services provided by Yahoo! Inc. of Santa Monica, Calif.; LinkedIn Corporation of Mountain View, Calif.; Facebook, Inc. of Palo Alto, Calif.; and MySpace, Inc. of Los Angeles, Calif.

In some embodiments, in addition to passing a relevant search query and/or search results to advertisement server 230, search server 220 may also pass information indicative of the popularity of the particular search query. By way of example, without limitation, such information may include a relative popularity weight or rank. Advertisement server 230 can then utilize such information in charging the clients thereof (i.e. the advertisers) for having placed the advertisement on more popular searches.

Figure 5:
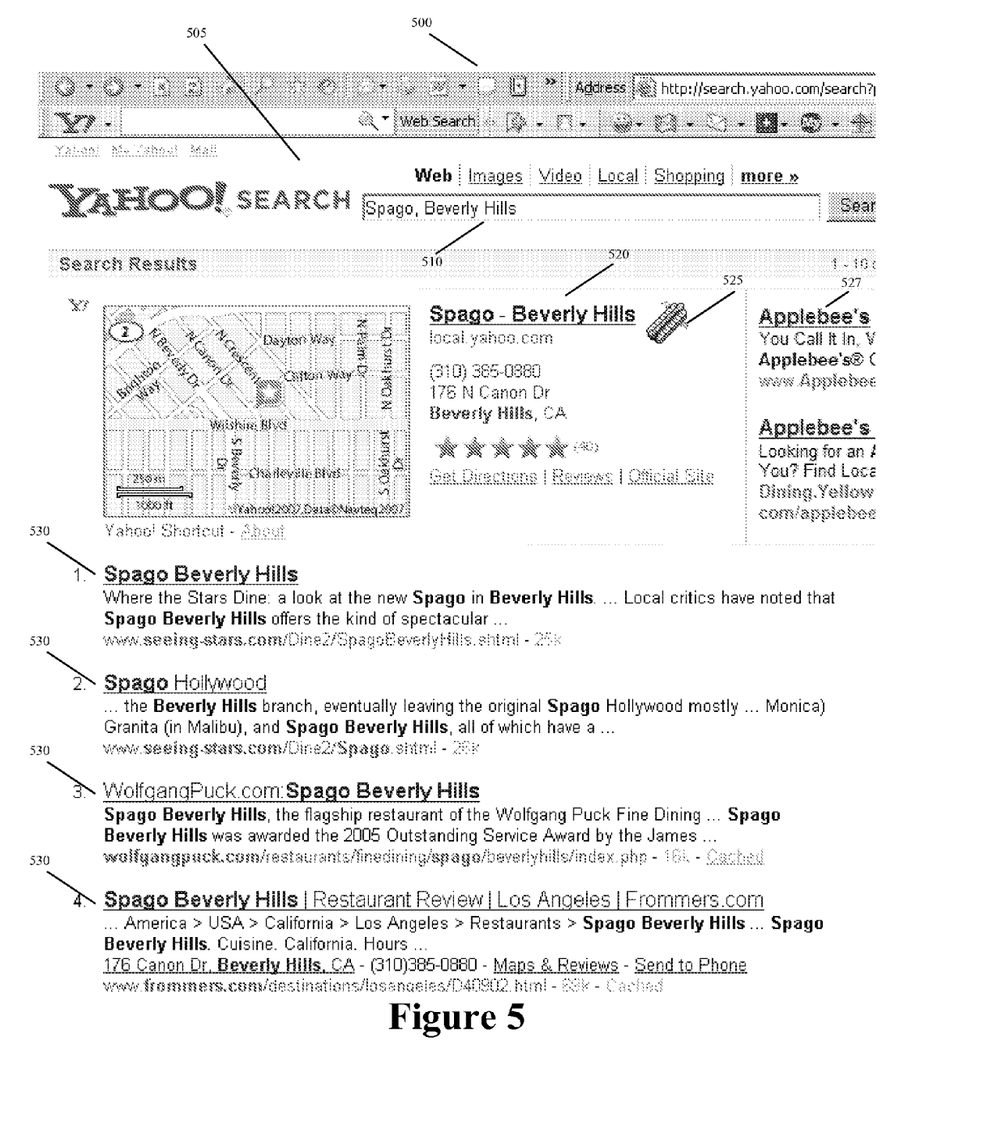
FIG. 5 is a screen capture illustrating an exemplary search results page displayed in a network browsing application.

FIG. 5 is a screen capture illustrating an exemplary browser interpretable document 505 comprising search results 520, 530 and advertisement 527, when the browser interpretable document is rendered by browser 500. In FIG. 5, the search results comprise both traditional search results 530 and targeted search results 520, as well as an advertisement 527. In providing targeted search results 520, the search server has determined that there is a high likelihood that the user is searching for a particular thing, such as a restaurant, hotel, motion picture, movie theater, automobile make or model, a retail store or brands carried therein, or the like. For example, FIG. 5 illustrates the results of the user's search from FIG. 4, which was for "Spago, Beverly Hills". Because the search server has identified that there is a Spago restaurant in Beverly Hills, the search server has inferred that there is a high likelihood that the user is interested in information about the restaurant itself, rather than other information which merely refers to the restaurant.

In some embodiments, because the restaurant has a popularity rating in excess of a certain threshold level, advertisement 527 is also displayed. Although in some embodiments advertisement 527 may correspond to information relevant to the user's search for a restaurant (e.g., taxi services, etc.), advertisement 527 may also be selected merely based on the fact that the restaurant is popular or that it has a popularity rating in excess of a certain threshold level. This allows advertisers to direct advertisements to users based purely on a perception that the user is interested in popular things. By way of example, without limitation, advertisement 527 may correspond to an advertisement for a fashion magazine, web site that focuses on celebrity gossip, a competing restaurant, or the like.

In addition to optional advertisements, when a search server determines that a search is directed to a particular item, the search server may include targeted search results 520 as part of the search results page. Targeted search results 520 may comprise a variety of information about the restaurant, including, without limitation, the address and telephone number of the restaurant, user ratings or reviews of the restaurant, links to additional ratings and reviews, and the like. Targeted search results 520 may also comprise a popularity indicator 525. By way of example, without limitation, a restaurant that has not received significant search engine or other traffic, or whose traffic has decreased over a certain period, may have a blue thermometer illustrated as popularity indicator 525. By contrast, a restaurant receiving consistently significant traffic or whose traffic has remained constant over a certain period of time may have an exploding red thermometer illustrated as popularity indicator 525. It should be apparent to one skilled in the art that alternative textual, graphical, video, or other content may be substituted for the above-described popularity indicators without departing from the spirit or the scope of the disclosed search query scoring system.

The popularity indicator chosen for a particular item may be based on computed popularity/scoring information about that item. The popularity/scoring information may be derived from a variety of sources, depending on preferences corresponding to a category with which the item is associated. By way of example, without limitation, in some embodiments motion picture popularity/scoring information may be based on the number of movie theaters in which the motion picture is being displayed, the number of tickets sold, the income generated by the motion picture, and comparisons to similar motion pictures from the previous year. By way of example, without limitation, a limited release motion picture released on May 25, 2007 might be compared to other limited release motion pictures released in May, 2007 and those released in May and June, 2006. The popularity/scoring information may be weighted such that the comparisons to similar, contemporary motion pictures are given more weight than those from the previous year. The popularity/scoring information can also allow the frequency with which the motion picture is the subject of a search engine query to influence the popularity of that motion picture. The relative weight of such factors can be associated with the category to which the particular thing (e.g., motion pictures) is assigned.

In some embodiments, the popularity/scoring information may be derived based on user interactions with the search results. By way of example, without limitation, a user may visit a motion picture related site, such as, without limitation, the Yahoo! Movies web site, and can type in a zipcode to find what motion pictures are playing at local movie theaters. In some embodiments, a zipcode may not be needed as geographic information, such as, without limitation, the location of the cellular tower at which the search query originated, the location of the router at which the search query originated, or the like may be determinable. Still further, the user's location may be determined based on historical search information, where a geographic region or location can be determined for the search results. Once the geographic information is known, the total number of moviegoers in that geographic region can then be computed, or at least approximated, based on the number of other moviegoers visiting the site that day. The instant system can assume that the user is likely to be going to the last movie theater whose site the user visits. Similarly, if the user clicks on a particular motion picture during the course of the current browser session, it can be assumed that the user is likely to be going to that theater to watch that motion picture. With such information, the number of potential moviegoers who are likely to visit a particular movie theater and watch a particular motion picture can be inferentially determined. Where the motion picture related site facilitates the purchase of tickets to a given theater, the statistical information can be more directly determined.

By way of further example, without limitation, for businesses such as restaurants, popularity/scoring information can be derived from publicly available revenue information, information from one or more reservation sites, the frequency with which the restaurant is the subject of a search query, and the like. In some embodiments, the popularity indicator for such a business may be determined by comparing the number of searches on the same day the previous week, the number of searches the same date/day of the year the previous month and year, and the like, and may be adjusted for seasonality. Table 1 provides pseudocode for determining a popularity indicator for a restaurant:

TABLE 1

If # of searches in the last hour > 30% the # of searches this day last week
    Then display "Very popular"
Else
    If > 10% then display "Average"
Else
    If < average # of searchers then display "Low popularity"

In the pseudocode of Table 1, if the number of searches for that particular restaurant in the last hour is greater than 30% of the number of searches for the same day and timeframe last week, then a "very popular" popularity indicator should be associated with the restaurant. If the number of searches in the last hour is greater than 10% of the number of searches for the same day and timeframe last week, then an "average" popularity indicator should be associated with the restaurant. If the number of searches in the last hour is less than the average number of searches for the corresponding time for the last 6 months, then a "low popularity" indicator should be associated with the restaurant.

In still other embodiments, the popularity information may be based, at least in part, on feedback received from users. By way of example, without limitation, users may manually submit the popularity of a location via a user interface provided by a browser running on a computing device, such as a browser running on a cellular telephone. This data may be cached for a period of time, or a set number of reviews may be cached, and newer entries in the cache may be given more weight than older entries, thereby allowing the popularity information to be relatively current. Similarly, when such manually entered information is used in combination with derived information, the manually entered information may be given a higher weight than the derived information, because the users are actually there to verify the information. Still further, where a user frequently supplies information and the information is generally believed to be accurate (e.g., based on a comparison of information from the user against contemporaneously provided information from other users, positive feedback received about the user, the frequency with which the user contributes content and other information to related web sites, and the like), the known reliable user's information may be weighted more heavily than information from users who are unknown. Similarly, where a user is identified as frequently providing incorrect information, any additional information provided by that user may be discarded or given a lower weight.

In still other embodiments, the popularity information may be derived from indirect information provided by users. By way of example, without limitation, when a user accesses search functionality from his or her cellular telephone, the current location of the cellular telephone may be provided as part of the search query. The current location information can then be aggregated to determine how crowded a location is, in near real time. By way of illustration, as users at a shopping mall, restaurant, movie theater, or the like use their cellular telephones to search for information, the instant system can capture the current location of the cellular phone. The aggregated information can then be used to determine how crowded the location is likely to be.

Figure 3:
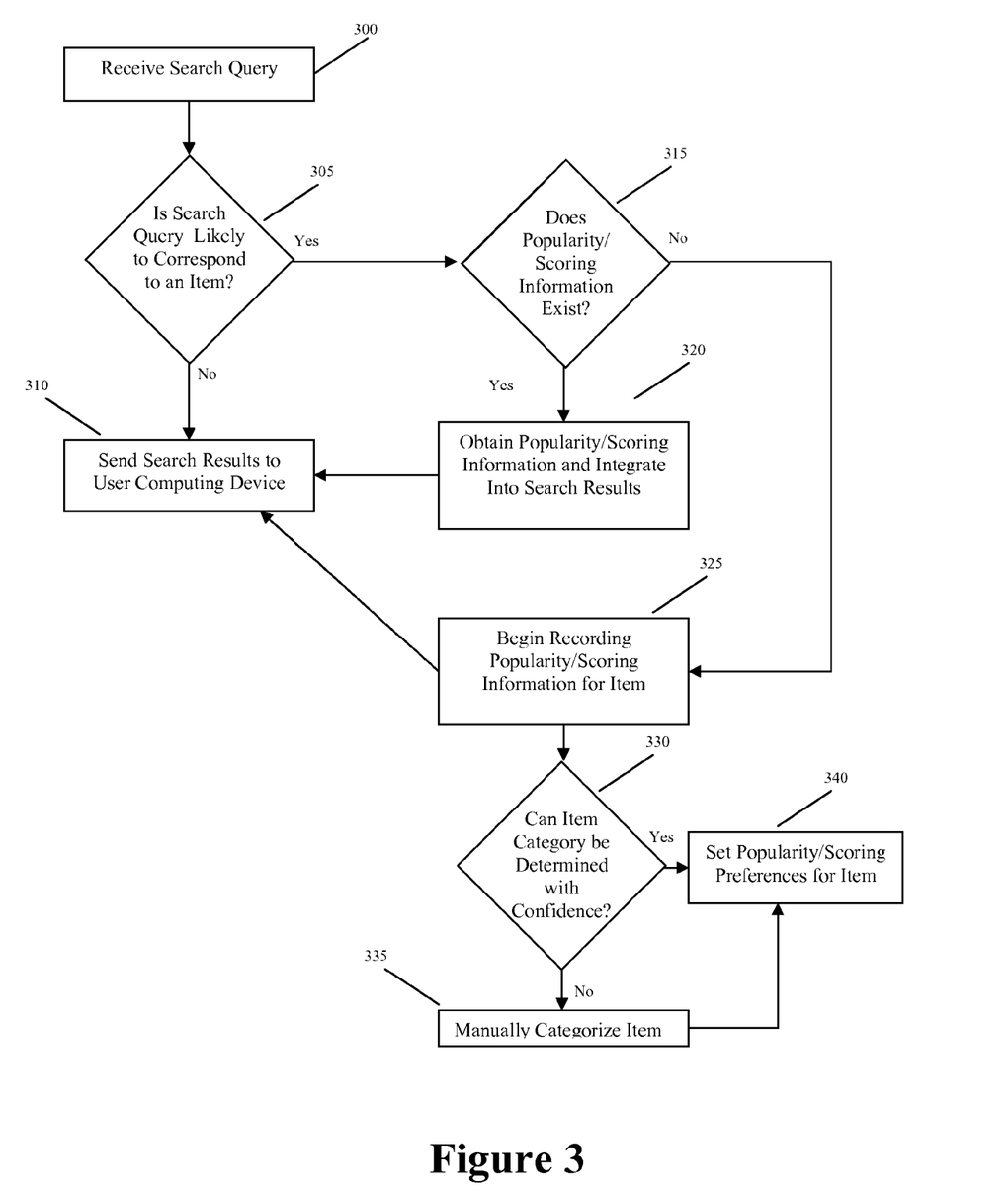
FIG. 3 is a flow chart illustrating an exemplary search query scoring and popularity monitoring method.

FIG. 3 is a flowchart illustrating an exemplary method by which scoring and popularity information can be determined for a given item. In block 300, the search server receives a search query from a user computing device. In block 305, the search server determines whether the search query is likely to correspond to a specific item or thing. For example, an index of popular search items or subjects may be maintained in a database that is queried in response to receipt of a search term, or a database of search items or subjects may be developed and modified over time that are known to relate to entities, people, places or things about which "popularity" is a relevant concept (i.e. "things"). If the query is likely to be of a more general nature, for example, a search for song lyrics or for instructions on how to configure new drivers in an operating system, some embodiments of the instant method may forego the inclusion of any popularity information and simply send the search results to the user computing device (illustrated by block 310 of FIG. 3).

Where the search is likely to correspond to an item, some embodiments of the instant method may determine whether popularity/scoring information is currently being tracked for that item (block 315). If popularity/scoring information exists, the popularity/scoring information is retrieved for the item. The popularity/scoring information can then be integrated into the search results (block 320), and the integrated search results sent to the user computing device (block 310).

If popularity/scoring information does not exist for the item, the instant method can begin recording popularity/scoring information for the item. Given that the popularity/scoring information did not previously exist, the search results are simply returned to the user computing device without the inclusion of any popularity/scoring information. The search server can then attempt to determine a category for the item that was the subject of the search (block 330). If the category can be determined with some level of confidence, a category may be automatically assigned to the item. If the category cannot be determined with confidence, then the item is flagged for manual categorization (block 335). Categorization allows certain preferences to be assigned to the popularity/scoring information.

By way of example, without limitation, when the first user performs a search for "Planet ZZZX, Will Smith" the instant method may determine, based on the inclusion of Will Smith in the search query, that the search query corresponds to a motion picture or musical work (i.e., an item) called "Planet ZZZX". Since no popularity/scoring information exists, any corresponding search results are simply returned to the user computing device. For the purposes of this example, even though some embodiments may treat motion pictures and musical works (e.g., albums, compact discs, music singles, and the like) similarly with respect to the preference information associated with items in those categories, the instant method may flag "Planet ZZZX" for manual categorization.

Once an appropriate category is assigned, corresponding preferences can be applied to the popularity/scoring information. Such preference information may include, without limitation, the historical period over which popularity/scoring information is to be determined, weighting to be applied to newer versus older historical information, icons or other indicia to be used when presenting popularity/scoring information, and the like. For example, a motion picture category may have a relatively short historical period (e.g., 2 weeks) associated therewith, and newer information may be more heavily weighted than older information. By contrast, restaurant popularity/scoring preferences may based on longer historical periods (e.g., 3 months), with even weight given to older and newer information, thereby not allowing short-term unusual occurrences (e.g., parades, water main breaks, acts of God, and the like) to unfairly influence the popularity information.

Figure 6:
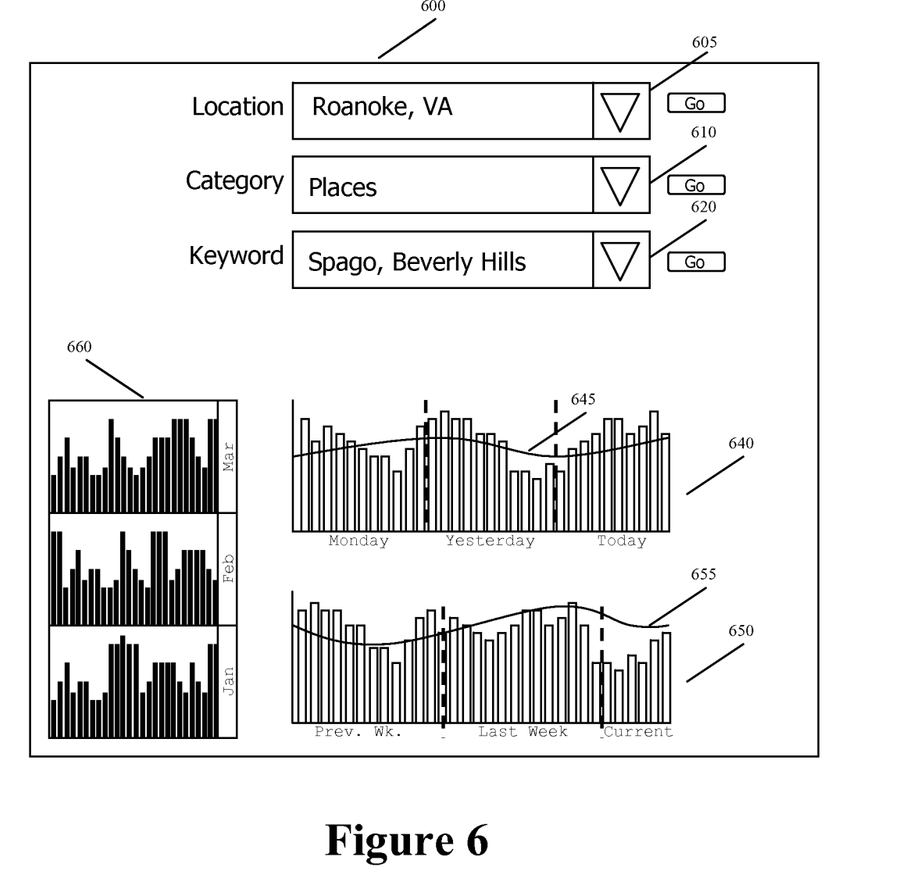
FIG. 6 illustrates an exemplary user interface through which popularity information about a particular item can be viewed.
Figure 7:
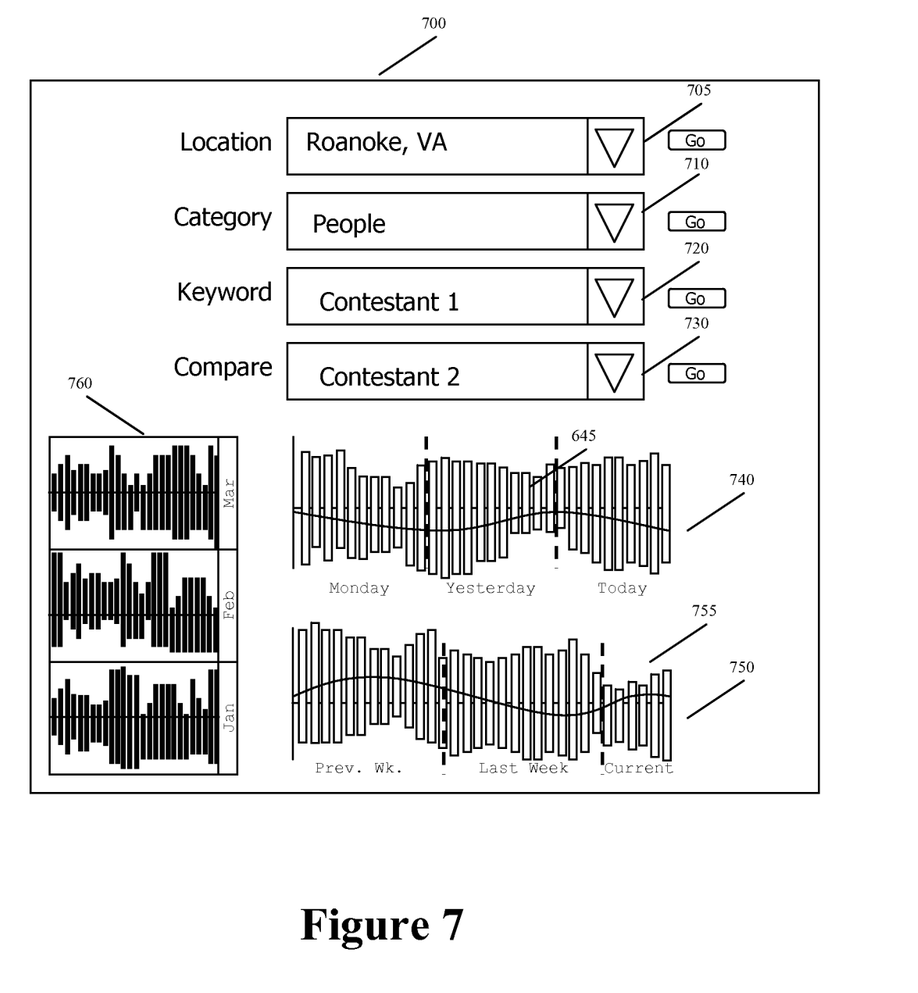
FIG. 7 illustrates an exemplary user interface through which the popularity of one item can be compared to the popularity of another item.

FIGS. 6 and 7 illustrate exemplary user interfaces 600, 700 through which popularity information can be viewed. In some embodiments, user interface 600 of FIG. 6 can allow the user to view popularity information for a specific item. To use the interface illustrated in FIG. 6, the user can enter or select a location of interest (e.g., Roanoke, Va.) from location drop-down list 605, and selects a category from one of the pre-defined categories provided in category drop-down list 610. The user then enters one or more keywords in keyword field 620, or selects from previously-used keywords using the drop-down features of keyword field 620. For the purposes of this search, the search server recognizes that the search is being performed for a specific item, such as a motion picture, restaurant, product, or the like. Thus, the search server can return historical popularity information, which may be presented by one or more graphs 640, 650, 660. By way of example, without limitation, graph 640 may illustrate hourly, semi-hourly, or other such detailed popularity trend information, including a weighted average indicator 645, covering one or more days. Graph 650 may illustrate weekly popularity trend information covering one or more weeks, and including weighted average indicator 655. Graphs 660 may illustrate the corresponding popularity trend information for one or more months.

The user interface of FIG. 7 allows the user to compare the popularity of two or more items. To use the interface for such comparisons, where location-specific popularity is desired, the location can be entered or selected from location drop-down 705. The user can also select a category from category drop-down 710, and enter appropriate keywords in keyword field 720 and compare field 730, then click an appropriate button, press the enter key or other key on the keyboard, or otherwise indicate that the search should be submitted. The search server can then return a comparison of the popularity between the two different items for which the user searched. By way of example, without limitation, the user may compare the popularity of two contestants on the American Idol television show as a means to predict who will be the next contestant to leave the show. The historical popularity information may be illustrated by one or more graphs 740, 750, 760. By way of example, without limitation, graph 740 may illustrate hourly, semi-hourly, or other such detailed popularity trend information, including a weighted average indicator 745, covering one or more days. Graph 750 may illustrate weekly popularity trend information covering one or more weeks, and including weighted average indicator 755. Graphs 760 may illustrate the corresponding popularity trend information for one or more months.

Figure 8:
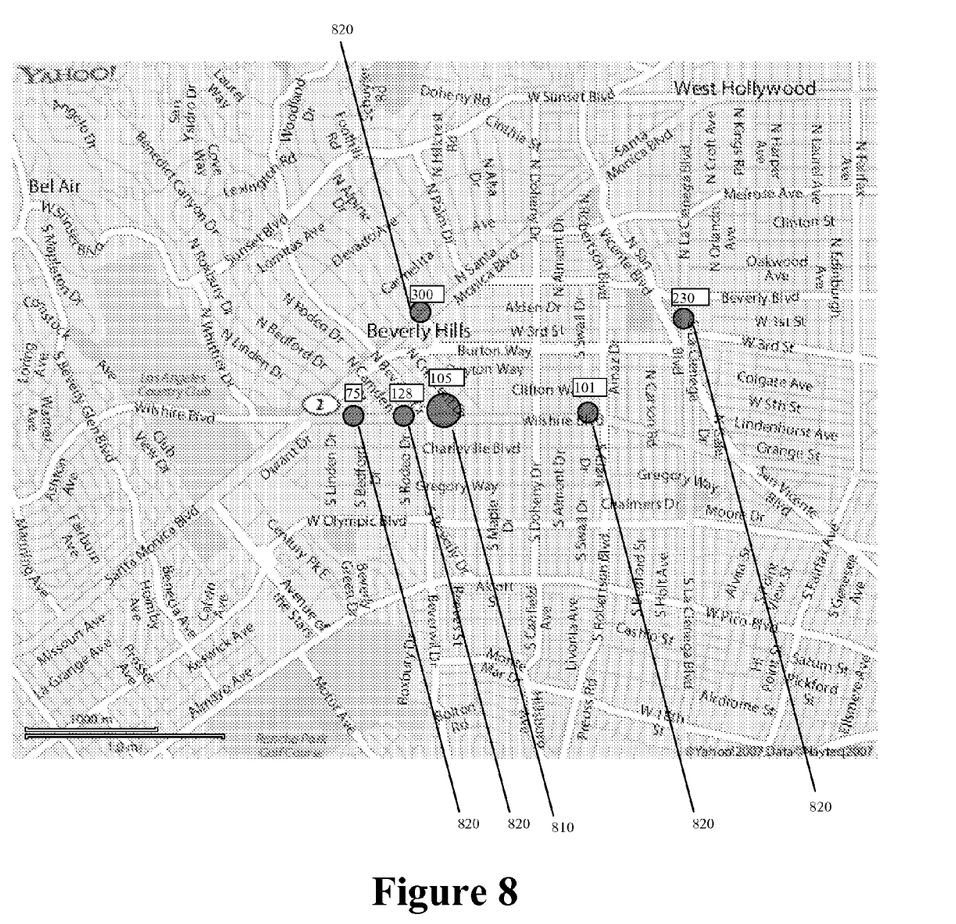
FIG. 8 illustrates an alternative user interface through which popularity information can be displayed.

FIG. 8 illustrates an alternative user interface 800 through which popularity information can be displayed. In FIG. 8, the user has performed a search similar to that described above for the Spago restaurant in Beverly Hills. In addition to showing the location of the restaurant on the map (illustrated by large circle 810), the map may also indicate the five most popular restaurants or other attractions closest to Spago's. In some embodiments, the user can control the types of other attractions returned. By way of example, without limitation, the user may request that popular movie theaters be shown in connection with the Spago search results. In addition to identifying the location of the popular movie theaters (indicated by small circles 820), the search results may also provide a numeric, textual, or other indicator of the popularity of each theater, thereby allowing the user to easily identify those theaters that are likely to be showing popular motion pictures that are in close proximity to the restaurant. In some embodiments, the user can click on a corresponding one of small circles 820 to see movie listings and other information about the theater. Similarly, a user interface similar to that of user interface 800 can be used to display results from a query such as "Chinese restaurants within 1 mile" of the user's current position. The instant system can utilize location information obtained from the browser or other software to deliver appropriate, targeted search results to the user. As described above, such location information may be derived from one or more sources, including, without limitation, the location of the cellular telephone tower with which the device is currently associated, information received from the user, or information received from a global positioning system ("GPS") device embedded in, attached to, or otherwise associated with the cellular telephone.

Referring again to FIG. 8, in some embodiments small circles 820 may correspond to one or more advertised items. By way of example, without limitation, when a user searches for a particular item that is determined to be popular (e.g., "Spago"), an advertiser may make certain demographic or other assumptions about the user, and wish to direct an advertisement for a product or service that is available geographically proximate to the particular item in the search results. Thus, small circles 820 may correspond to a variety of different product and/or service providers. For example, one of small circles 820 may correspond to a jewelry store that carries trendy jewelry, another may correspond to a day spa offering new and popular treatments, etc.

The rates charged by the advertising server for placing the corresponding advertisements may vary based on the popularity of the item being searched. By way of example, without limitation, an advertiser might charge $0.10 per impression (i.e. per time the advertisement is displayed) for the top 100 most popular search queries, or most popular search queries in a particular geographic region, on a given day. Advertisers whose advertisements are displayed with the next 150 most popular search queries might be billed at a rate of $0.08 per impression, and those corresponding to the next 500 most popular might be billed at a rate of $0.05 per impression. The example provided is intended for illustrative purposes only, and should not be construed as limiting the instant system and method to a particular method for calculating advertising-related bills.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

Numerous other changes may be made that will readily suggest themselves to those skilled in the art and which are encompassed in the spirit of the invention disclosed and as defined in the appended claims.

What is claimed is:

1. A non-transitory computer-readable storage medium tangibly encoded with computer program process code, that when executed by a search server, performs a method comprising:
   receiving a search query from a user computing device, said search query comprising a string of characters representing a particular thing;
   searching over a network, a repository of digital information related to the search server based on search query, said searching comprising identifying a set of search results corresponding to said particular thing;
   searching, over a network, for popularity information for each search result, said popularity information search comprising analyzing indirect links or Uniform Resource Locators (URLs) associated with each search result, and based on said analysis, identifying behavior activity of other users respective to each result, said behavior activity comprising data representing said popularity information for each search result;
   communicating, over the network to the user computing device, a user interface (UI) comprising the search results and an associated indicator reflective of the popularity information for each search result, said communication causing each of the indicators to be displayed along with results of the search query within said UI, said communication further causing said user computing device to execute a browser helper application to facilitate the search server's monitoring of user interactions with the UI;
   automatically monitoring, over the network via the search server, user interactions with the displayed results within the communicated UI, said automatic monitoring occurring without requiring additional input by performing said monitoring without necessitating the use of the indirect links or the URLs associated with each search result; and
   causing, via the search sever over the network, based on said monitoring, the communicated UI to be updated, said updating comprising updating the search results and popularity information for the particular thing within the UI displayed on the user computing device based on the monitored user interactions, said popularity information updated based on weighted indirect information derived from users associated with said monitored interactions, said indirect information comprising additional information about the users that is automatically determined from analysis of the user interactions and weighted based on an identity of each of the users.

2. The non-transitory computer-readable storage medium of claim 1, wherein the thing comprising one of a restaurant, a make of automobile, a motion picture, a motion picture theater, a retail store, and a hotel.

3. The non-transitory computer-readable storage medium of claim 1, wherein the popularity information comprising a relative popularity score.

4. The non-transitory computer-readable storage medium of claim 3, wherein the popularity information indicator comprising a graphic reflective of the relative popularity score.

5. The non-transitory computer-readable storage medium of claim 3, wherein the relative popularity score reflecting a difference in a number of search queries related to the particular thing received over a first period of time compared to the number of search queries related to the particular thing received over a second period of time.

6. The non-transitory computer-readable storage medium of claim 3, wherein the relative popularity score reflecting a difference in sales of the particular thing as measured over a first period of time compared to sales of the particular thing as measured over to a second period of time.

7. The non-transitory computer-readable storage medium of claim 3, wherein the relative popularity score reflecting a difference in the revenues from sales of the particular thing over a first period of time compared to a second period of time.

8. The non-transitory computer-readable storage medium of claim 3, wherein the relative popularity score reflecting a difference in the popularity of the particular thing compared to the popularity of similar things.

9. The non-transitory computer-readable storage medium of claim 3, wherein the popularity information indicator comprising a graphic, the graphic indicative of the relative popularity score.

10. The non-transitory computer-readable storage medium of claim 3 further comprising:
    obtaining targeted information about the thing; and,
    communicating the targeted information to be displayed for the user.

11. The non-transitory computer-readable storage medium of claim 10, wherein the targeted information being displayed along with the search results.

12. The non-transitory computer-readable storage medium of claim 10, wherein the targeted information being displayed only when the relative popularity score exceeds a given threshold.

13. The non-transitory computer-readable storage medium of claim 10, wherein the popularity information indicator being displayed as part of the targeted information.

14. The non-transitory computer-readable storage medium of claim 10, wherein the targeted information comprising at least one advertisement.

15. The non-transitory computer-readable storage medium of claim 10, wherein the targeted information comprising a map on which the location of the thing is displayed.

16. The non-transitory computer-readable storage medium of claim 15, wherein the map further comprising indicators of similar things that are geographically proximate to the thing.

17. The non-transitory computer-readable storage medium of claim 16, wherein the indicators comprising representations of relative popularity scores for each of the similar things displayed on the map.

18. The non-transitory computer-readable storage medium of claim 16, wherein each indicator comprising a link to information about the respective similar thing.

19. The non-transitory computer-readable storage medium of claim 1, wherein the search query being received from a browser running on the user computing device.

20. The non-transitory computer-readable storage medium of claim 1, wherein the popularity information indicator being displayed in a browser running on the user computing device.

21. A method comprising:
receiving, at a search server, a search query from a user computing device, said search query comprising a string of characters representing a particular thing;
searching, over a network via the search server, a repository of digital information related to the search server based on search query, said searching comprising identifying a set of search results corresponding to said particular thing;
searching, over the network via the search server, for popularity information for each search result, said popularity information search comprising analyzing indirect links or Uniform Resource Locators (URLs) associated with each search result, and based on said analysis, identifying behavior activity of other users respective to each result, said behavior activity comprising data representing said popularity information for each search result;
communicating, via the search server over the network to the user computing device, a user interface (UI) comprising the search results and an associated indicator reflective of the popularity information for each search result, said communication causing each of the indicators to be displayed along with results of the search query within said UI, said communication further causing said user computing device to execute a browser helper application to facilitate the search server's monitoring of user interactions with the UI;
automatically monitoring, over the network via the search server, user interactions with the displayed results within the communicated UI, said automatic monitoring occurring without requiring additional input by performing said monitoring without necessitating the use of the indirect links or the URLs associated with each search result; and
causing, via the search sever over the network, based on said monitoring, the communicated UI to be updated, said updating comprising updating the search results and popularity information for the particular thing within the UI displayed on the user computing device based on the monitored user interactions, said popularity information updated based on weighted indirect information derived from users associated with said monitored interactions, said indirect information comprising additional information about the users that is automatically determined from analysis of the user interactions and weighted based on an identity of each of the users.

22. The method of claim 21, the thing comprising one of a restaurant, a make of automobile, a motion picture, a motion picture theater, a retail store, and a hotel.

23. The method of claim 21, the popularity information comprising a relative popularity score.

24. The method of claim 23, the popularity information indicator comprising a graphic reflective of the relative popularity score.

25. The method of claim 23, the relative popularity score reflecting a difference in the number of search queries related to the particular thing received over a first period of time compared to a second period of time.

26. The method of claim 23, the relative popularity score reflecting a difference in the sales of the particular thing over a first period of time compared to sales of the particular thing as measured over a second period of time.

27. The method of claim 23, the relative popularity score reflecting a difference in the revenues from sales of the particular thing as measured over a first period of time compared to a revenues from sales of the particular thing as measured over a second period of time.

28. The method of claim 23, the relative popularity score reflecting a difference in the popularity of the particular thing compared to the popularity of similar things.

29. The method of claim 23, the popularity information indicator comprising a graphic, the graphic indicative of the relative popularity score.

30. The method of claim 23 further comprising:
obtaining targeted information about the thing; and,
transmitting the targeted information to the user computer for display to the user.

31. The method of claim 30, the targeted information being displayed only when the relative popularity score exceeds a given threshold.

32. The method of claim 30, the targeted information comprising at least one advertisement.

33. The method of claim 30, the targeted information comprising a map on which the location of the thing is displayed.

34. The method of claim 33, the map further comprising indicators of similar things that are geographically proximate to the thing.

35. The method of claim 34, the indicators comprising representations of relative popularity scores for each of the similar things displayed on the map.

36. The method of claim 34, each indicator comprising a link to information about the respective similar thing.

37. The method of claim 23, the search query being received from a browser running on a user computer.

38. A search server comprising:
a processor;
a non-transitory computer-readable storage medium for tangibly storing thereon program logic for execution by the processor, the program logic comprising:
logic executed by the processor for receiving a search query from a user computing device, said search query comprising a string of characters representing a particular thing;
logic executed by the processor for searching over a network, a repository of digital information related to the search server based on search query, said searching comprising identifying a set of search results corresponding to said particular thing;
logic executed by the processor for searching, over the network, for popularity information for each search result, said popularity information search comprising analyzing indirect links or Uniform Resource Locators (URLs) associated with each search result, and based on said analysis, identifying behavior activity of other users respective to each result, said behavior activity comprising data representing said popularity information for each search result;
logic executed by the processor for communicating, over the network to the user computing device, a user interface (UI) comprising the search results and an associated indicator reflective of the popularity information for each search result, said communication causing each of the indicators to be displayed along with results of the search query within said UI, said communication further causing said user computing device to execute a browser helper application to facilitate the search server's monitoring of user interactions with the UI;

logic executed by the processor for automatically monitoring, over the network via the search server, user interactions with the displayed results within the communicated UI, said automatic monitoring occurring without requiring additional input by performing said monitoring without necessitating the use of the indirect links or the URLs associated with each search result; and logic executed by the processor for causing, via the search sever over the network, based on said monitoring, the communicated UI to be updated, said updating comprising updating the search results and popularity information for the particular thing within the UI displayed on the user computing device based on the monitored user interactions, said popularity information updated based on weighted indirect information derived from users associated with said monitored interactions, said indirect information comprising additional information about the users that is automatically determined from analysis of the user interactions and weighted based on an identity of each of the users.

39. The search server of claim 38, the thing comprising one of a restaurant, a make of automobile, a motion picture, a motion picture theater, a retail store, and a hotel.

40. The search server of claim 38, the popularity information comprising a relative popularity score.

41. The search server of claim 40, the popularity information indicator comprising a graphic reflective of the relative popularity score.

42. The search server of claim 40, the relative popularity score reflecting a difference in a number of search queries related to the particular thing received over a first period of time compared to the number of search queries related to the particular thing received over a second period of time.

43. The search server of claim 40, the relative popularity score reflecting a difference in sales of the particular thing as measured over a first period of time compared to sales of the particular thing as measured over to a second period of time.

44. The search server of claim 40, the relative popularity score reflecting a difference in the revenues from sales of the particular thing over a first period of time compared to a second period of time.

45. The search server of claim 40, the relative popularity score reflecting a difference in the popularity of the particular thing compared to the popularity of similar things.

46. The search server of claim 40, the popularity information indicator comprising a graphic, the graphic indicative of the relative popularity score.

47. The search server of claim 40 further comprising:
logic executed by the processor for obtaining targeted information about the thing; and,
logic executed by the processor for communicating the targeted information for display by the user computing device.

48. The search server of claim 47, the targeted information being displayed along with the search results.

49. The search server of claim 47, the targeted information being displayed only when the relative popularity score exceeds a given threshold.

50. The search server of claim 47, the popularity information indicator being displayed as part of the targeted information.

51. The search server of claim 47, the targeted information comprising at least one advertisement.

52. The search server of claim 47, the targeted information comprising a map on which the location of the thing is displayed.

53. The search server of claim 52, the map further comprising indicators of similar things that are geographically proximate to the thing.

54. The search server of claim 53, the indicators comprising representations of relative popularity scores for each of the similar things displayed on the map.

55. The search server of claim 53, each indicator comprising a link to information about the respective similar thing.

56. The search server of claim 38, the search query being received from a browser running on the user computing device.

57. The search server of claim 38, the popularity information indicator being displayed in a browser running on the user computing device.

* * * * *